United States Patent

[11] 3,634,883

[72] Inventor Leonard L. Kreidermacher
Acton, Mass.
[21] Appl. No. 875,910
[22] Filed Nov. 12, 1969
[45] Patented Jan. 11, 1972
[73] Assignee Honeywell Inc.
Minneapolis, Minn.

[54] MICROINSTRUCTION ADDRESS MODIFICATION AND BRANCH SYSTEM
14 Claims, 17 Drawing Figs.

[52] U.S. Cl. .......... 340/172.5
[51] Int. Cl. .......... G06f 9/20
[50] Field of Search .......... 235/157; 340/172.5

[56] References Cited

UNITED STATES PATENTS

| | | | |
|---|---|---|---|
| 3,160,858 | 12/1964 | Adams et al. | 340/172.5 |
| 3,238,508 | 3/1966 | Kelley | 340/172.5 |
| 3,351,909 | 11/1967 | Hummel | 340/172.5 |
| 3,380,025 | 4/1968 | Ragland | 340/172.5 |
| 3,454,932 | 7/1969 | Bahrs et al. | 340/172.5 |
| 3,503,046 | 3/1970 | Geissler | 340/172.5 |
| 3,530,439 | 9/1970 | Smith | 340/172.5 |

*Primary Examiner*—Gareth D. Shaw
*Assistant Examiner*—Melvin B. Chapnick
*Attorneys*—Fred Jacob and Ronald T. Reiling

ABSTRACT: A microprogram branch technique is provided whereby the present microaddress for a read-only memory (ROM) is conditionally modified by selectable bit insertions corresponding to branch conditions. This provides a new microaddress containing a microinstruction for performing an operation corresponding to the branch conditions which cause this address. Two basic cases are considered, one where various types of addressing are controlled such as: indirect, indexed, or void address; the other where multiconditioned arithmetic control, such as may occur in multiplication or division, is translated into microbranches to expedite the operation execution and to minimize the number of microinstructions required.

INVENTOR
LEONARD L. KREIDERMACHER
BY [signature]
ATTORNEY

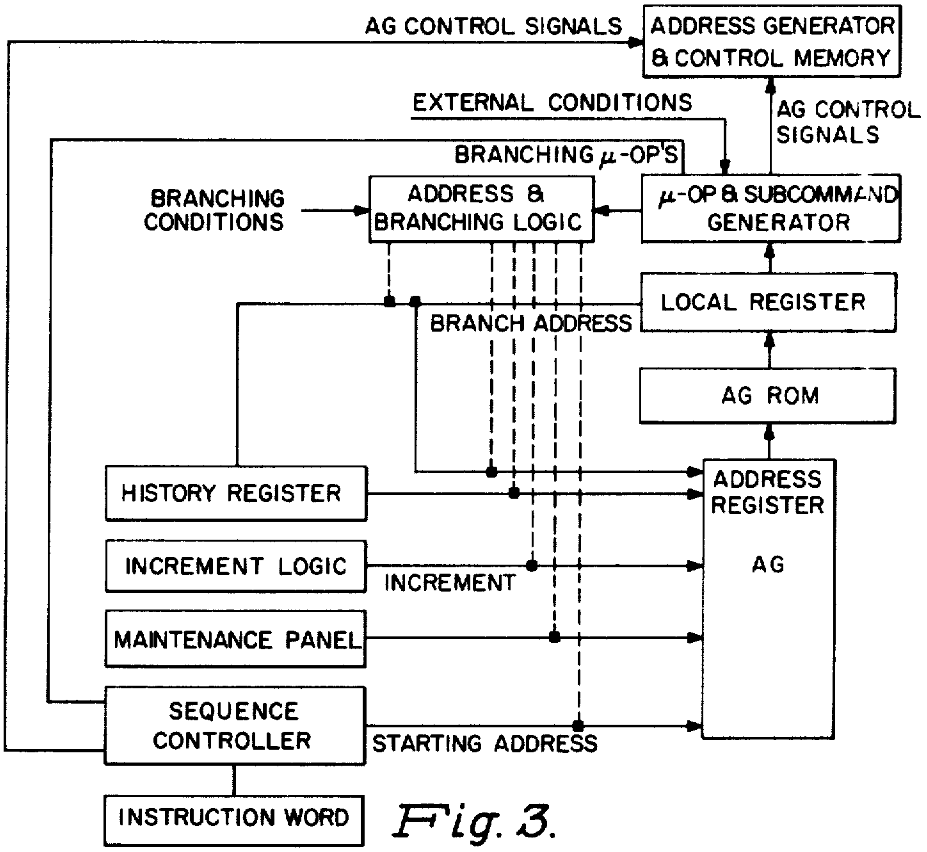
Fig. 3.
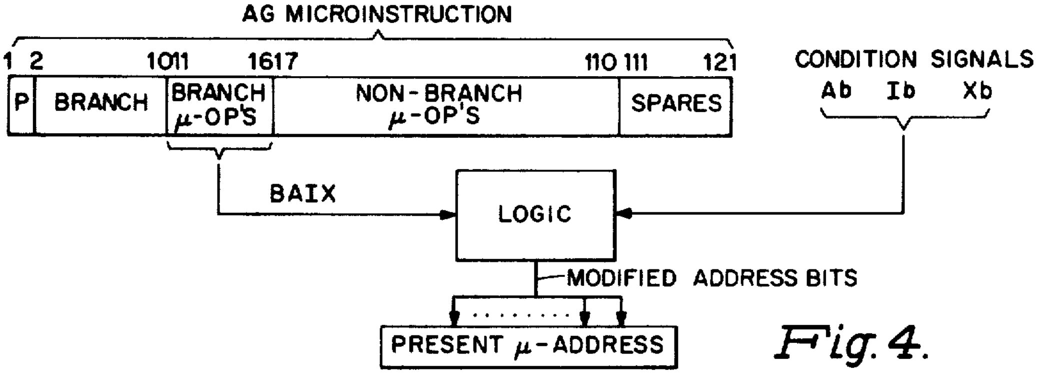
Fig. 4.
BAIX = 1
ORIGINAL
AROM = XXO
| Xb | Ib | Ab | FUNCTION | NEW AROM | | | AROM 1-3 | AROM 1-2 | AROM 1-1 |
|---|---|---|---|---|---|---|---|---|---|
| 0 | 0 | 0 | TEST FOR EXEC | X | X | 4 | 1 | 0 | 0 |
| 0 | 0 | 1 | READ c(A) | X | X | 1 | 0 | 0 | 1 |
| 0 | 1 | 1 | READ c(c(A)) | X | X | 3 | 0 | 1 | 1 |
| 1 | 0 | 1 | READ c(A+X) | X | X | 5 | 1 | 0 | 1 |
| 1 | 1 | 1 | READ c(c(A)+X) | X | X | 7 | 1 | 1 | 1 |
Fig. 5.
INVENTOR
LEONARD L. KREIDERMACHER
BY [signature]
ATTORNEY

INVENTOR
LEONARD L. KREIDERMACHER

BY Lester S. Hecht

ATTORNEY

INVENTOR
LEONARD L. KREIDERMACHER
BY Lester S. Hecht
ATTORNEY

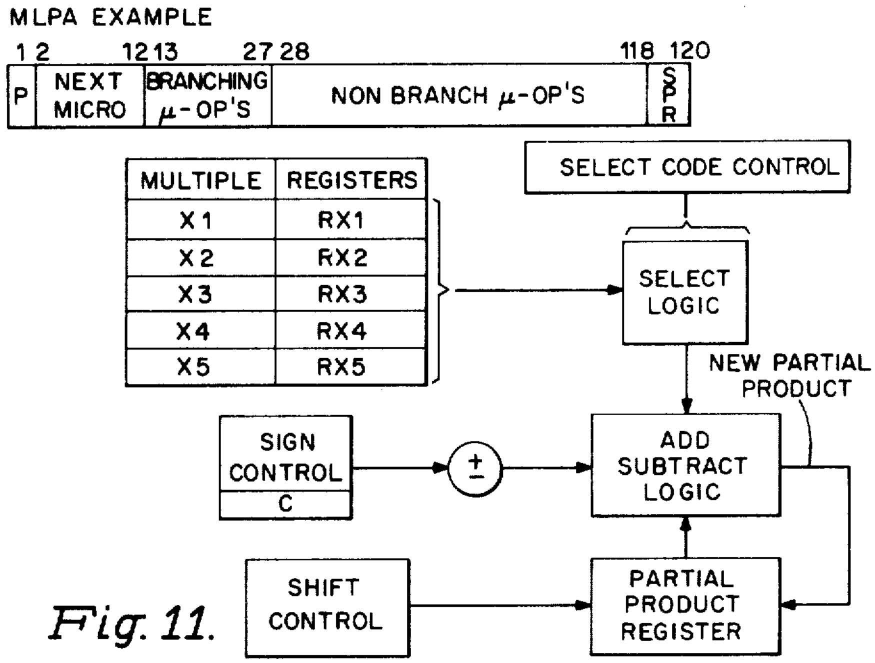

Fig. 11.

| | |
|---|---|
| MLPA | ADD C TO MULTIPLIER AND<br>BRANCH TO (B) FOR SUM = 6-9<br>TO (C) FOR SUM = 1-5<br>TO (D) FOR SUM = 10<br>TO (E) FOR SUM = 0 |
| MLPB | ENTER SELECT CODES 4,3,2,1 FOR 6,7,8,9<br>RESPECTIVELY, SET SIGN CONTROL C=1<br>SUBTRACT |
| MLPC | ENTER-SELECT CODE 1-5 FOR 1-5,<br>RESPECTIVELY, SIGN SIGN CONTROL C=0<br>ADD |
| MLPD | SET SIGN CONTROL C=1<br>BRANCH TO (E) |
| MLPE | SHIFT MULTIPLICAND TO RT<br>m = m+1 |
| MLPF | IF m=12 READ NEXT MICRO<br>IF m≠12 BRANCH TO A |
| NEXT MICRO | AFTER m=12 CONTAINS<br>MICRO-INSTRUCTION FOR READING<br>NEXT MICRO-INSTRUCTION |

Fig. 12.

INVENTOR
LEONARD L. KREIDERMACHER
BY Lester S. Hecht
ATTORNEY

INVENTOR
LEONARD L. KREIDERMACHER
BY
ATTORNEY

MICROINSTRUCTION ADDRESS MODIFICATION AND BRANCH SYSTEM

The present invention relates to microprogram branch control and, more particularly, to a method of microprogrammed branching whereby the present microaddress contained in a ROM (head-only memory) address register is directly modified by certain branch condition signals in the event of the existence of a related μ-OP branch code in the contents of the present microinstruction.

Although microprogramming as such is not a new development in the computer art, the technique of microbranching has, heretofore, had very limited application. In general, the approach has been to use the microprogram to step sequentially through a series of predesignated microinstructions which define the so-called initiating macroinstruction. Thus, in general, branching has been, in the prior art, the function of the macroinstruction, and the particular execution of a branch macroinstruction is then carried out by the microinstruction sequence.

Although an exhaustive presentation of all texts on microprogramming would be impractical as part of the present disclosure, the following references will provide an appropriate base for discussion and accordingly are incorporated herein by reference.

PRIOR ART MICROPROGRAMMING REFERENCES

1. "Microprogramming and the Design of the Control Circuits in an Electronic Digital Computer" by M. V. Wilkes and J. B. Stringer, Proc. Cambridge Phil. Soc., pp. 230 through 238, Apr. 1953 issue.

2. R. J. Mercer, "Microprogramming" in Apr. 1957 issue of Jour. Assoc. Computing Machinery, pp. 157 through 171.

3. U.S. Pat. Nos.: 3,215,987; 3,245,044; 3,246,303; 3,258,748; 3,300,764; 3,302,183; 3,349,379; 3,380,025; 3,387,279; 3,389,376; 3,391,394; 3,400,371; 3,434,112; 3,444,527; 3,469,247.

4. Honeywell Computer Journal, Winter-Spring 1968, "-Model 4200–8200 Read-Only Memory Control Logic," by Stuart Klein and Scott Schwartz.

5. Copending patent application assigned to same assignee as this application: "Microprogram Control Apparatus" by Scott Schwartz, Ser. No. 694,928 filed Jan. 2, 1968 now U.S. Pat. No. 3,560,933.

RELATED COPENDING APPLICATIONS

1. Copending patent application assigned to same assignee as this application: "Method and Apparatus for Peripheral Device Assignment, and Validity Check and Relocation, if Assignment is Valid" by James B. Geyer and Victor M. Benson, Ser. No. 875,901 filed Nov. 12, 1969.

2. Copending patent application assigned to same assignee as this application: "Instruction Translation Control With Extended Address Prefix Decoding" by John Mekota, David Hudson, Thomas Rankin, Jean Champagne, Ser. No. 875,902 filed Nov. 12, 1969.

3. Copending patent application assigned to same assignee as this application: "Multiple Branch Technique" by George S. Hoff and Ming-Tzer Miu, Ser. No. 694,949 filed Jan. 2, 1968 now U.S. Pat. No. 3,570,006.

4. Copending patent application assigned to same assignee as this application: "Interlocking Data Subprocessors" by Victor M. Benson and Stuart K. Klein, Ser. No. 718,493 filed Apr. 3, 1968.

5. Copending patent application assigned to same assignee as this application: "Sharing of Microprograms Between Processors" by George Hoff and Richard Kelly, Ser. No. 875,900 filed Nov. 12, 1969.

6. Copending patent application assigned to same assignee as this application: "Apparatus for Performing Arithmetic Operation on Numbers Using a Multiple Generating and Storage Technique," by Leonard L. Kreidermacher and David M. Hudson Ser. No. 875,909 filed Nov. 12, 1969.

7. Copending patent application assigned to same assignee as this application: "Apparatus for Independently Assigning Time-Slot Intervals and Read-Write Channels in a Multiprocessor System" by Robert Fischer, Ser. No. 771,147 filed Oct. 28, 1968.

As more sophisticated instructions have been required in computer systems, it has become necessary to add capability to the microprogramming hardware itself. One important improvement has occurred in the speed or cycle time of the ROM memory. It is important that the cycle-time of the ROM memory be small enough so as to permit a number of micromemory cycles within a main memory cycle. But the increase in speed of the ROM does not completely solve the problem.

Accordingly, various other means have been attempted to improve the efficiency of the ROM such as multiple-branching techniques. An improved technique for accomplishing this is described and claimed in copending patent application Ser. No. 694,949 for "Multiple Branch Technique" by Miu and Hoff now U.S. Pat. No. 3,570,006 constituting reference No. 3 above.

In reference No. 3 copending patent application a plurality of branch addresses are provided so that, corresponding to each branch condition, a different jump or branch address is provided.

While this technique will provide an important improvement in ROM usage it is inefficient in many cases with respect to the amount of hardware required to accomplish the desired result.

Accordingly, it is an object of the present invention to provide a microbranching technique which directly modifies the present microaddress as a function of certain branch conditions.

More specifically, the invention contemplates the logical combination of certain selected condition bits with certain selected bits in the present ROM address so that a new address is directly obtained as a function of the condition bits.

In one illustrative case which is described in detail herein, microbranching for address control is made possible in an extremely simple and effective manner. In particular three branch control bits, referred to herein as A*b*, I*b*, and X*b*, respectively, are automatically "OR-ed" with predetermined bits of the present ROM address to form a new address, if such address modification is specified by a particular μ-OP branch code in the microinstruction just read.

In the typical case of utilization of the invention in this respect, the particular microbranch instruction is placed in a ROM address location where the least significant octal code is a zero. Then, as an illustrative modification technique, it is assumed that condition bits X*b*, I*b* and A*b* are inserted in that order from left to right to constitute a new, least significant, octal digit.

The following chart illustrates the effectiveness of the direct bit modification branch method. In this definition, XX7=XX1 11, signifies any octal address (where $7_8=111_2$) where the least significant octal digit is a 7. The letter A refers to the contents of the microaddress register. The expression, A=A means that the A address is used directly. A = void means that no address is present. A=*c*(A) means that the contents of the A address are used as the new A address. This is indirect addressing. A=A+X means that the new A address is the sum of the previous address and X. This is indexing A=*c*(A)+X covers the situation where both indirect and indexed addressing is present.

ADDRESS CONTROL CHART

XX7 (XX111) Replace A with *c*(A), A=*c*(A), and go to XX5 (XX101)

XX5 (XX101) Replace A with A+X, A=A+X, and go to XX1 (XX001)

XX3 (XX011) Replace A with *c*(A), A=*c*(A), and go to XX1 (XX001)

XX1 (XX001) Read operand = $c(A)$, and go to branch from $XX_4$ (XX100)

XX4 (XX100) Test for ready for Execution

XX0 (XX000) Address branch $\mu$-OP

All five of the basic address possibilities are covered by the above chart. If the branch $\mu$-OP causes the modification of the address to XX7 the microsequence proceeds: XX7–XX5 –XX1–4, which means that firstly the A address is replaced by $c(A)$, then this direct A address is added to the index, the contents of the indirect, indexed address are read, and then a forced branch to the "Test for Ready for Execution" is made.

If the first modified address is XX5, the sequence is:

XX5–XX1–XX4.

If the first modified address is XX3, the sequence is:

XX3–XX1–XX4.

If the first modified address is XX1, the sequence is:

XX1–XX4.

If the first address is XX0, it is directly translated to:

XX4.

In this manner a minimum of microinstructions are required and the branching proceeds in the most direct manner possible.

It should be apparent from this brief description that the appropriate microinstruction for all types of addressing may be directly accessed by the most efficient approach possible, since the condition codes establish the most direct path of microinstruction fetch, and then may be modified after each microinstruction execution to pick up the next related microinstruction.

Accordingly, it is another object of the invention to provide a microbranch technique wherein condition signals, corresponding to an instruction to be executed, are translated directly into addresses wherein microinstructions are stored for performing the desired function.

Another application of the invention is considered herein where the improved microbranch control is employed to carry out the execution of a decimal multiply. The particular decimal multiply selected, as an illustration of the present invention, is one which is described and claimed in: "Apparatus for Performing Arithmetic Operation on Numbers Using a Multiple Generating and Storage Technique," by Leonard L. Kreidermacher and David M. Hudson, Ser. No. 875,909 filed Nov. 12, 1969.

As noted in further detail in the copending patent application (Ser. No. 875,909 filed Nov. 12, 1969) mentioned above, it is necessary to branch, as part of the improved multiplication technique, to a subcommand or microoperation where the proper submultiple of the operand is selected for a particular decimal multiplier digit. The invention is used in this case to provide a direct logical branch to one of four different microinstructions depending upon the sum of the multiplication carry and the present multiplier digit.

The branch control for multiply is summarized in the following table where $MR(m)$ is the "$m$th" multiplier digit, and C is the carryover from the last multiplication operation during which time a partial product is formed. Both "$m$" and "C" are initially set to zero. The branch functions: (B); (C); (D); and (E) will be noted to correspond to the function required to operate upon the branch conditions causing that entry.

Multiplication Branch Table

| (A)C+MR(m)=? | Branch to | Function to be Performed |
|---|---|---|
| 0 | (E) | Shift Multiplicand Right one Digit position and increment "$m$" then go to (F) ($m$=$m$+1) |
| 1–5 | (C) | Set $C$=0, Add submultiples X1 through X5 for 1–5, respectively, then go to (E) |
| 6–9 | (B) | Set $C$=1, subtract submultiples X4–X1 for 6–9, respectively, then go to (E) |
| 10 | (D) | Set $C$=1, branch to (E) |

(F) Compare "$m$" to the number of significant multiplier digits (assumed to be 12 in example herein), if $m$=12 go to next instruction, if not return to (A).

Accordingly, it is yet another object of the invention to provide a microbranch instruction which facilitates the microprogrammed execution of an arithmetic operation such as decimal multiplication.

Although the invention is illustrated herein by showing only two fairly simple cases it will be understood that, in general usage, the concept presented here permits branching by direct ROM address modification to any of $2^n$ locations, where $n$ is the number of branch conditions. Furthermore, although address modification in the low order address bits is illustrated, in some cases it may be desired to modify certain of the higher order address bits so that a jump or branch may be made from a low-order ROM address to one of several high-order addresses.

Before entering into the detailed discussion of the practice of the invention it may be helpful to point out a few basic considerations with respect to the conventional, prior art, branch instruction.

Although multiple-bit condition codes are frequently provided in the prior art as, for example, in the well-known IBM 360 system, only two exits are possible from the instruction. If the logic of the condition code has not been satisfied, the next instruction for the program is fetched in the normal sequence (the next instruction address). On the other hand, if the condition code is satisfied, where this code may constitute a complex mask-function, then the branch is performed by replacing the present instruction address with the branch address which is directly or indirectly derived from the branch instruction itself.

Thus, the characteristic feature of the present invention which distinguishes it from either the conventional macroprogram technique (i.e. where normal instructions are used), or from conventional microprogram techniques, is that the present address of the instruction or the microinstruction is not replaced but rather is directly branch-condition modified. This means that, in the practice of the present invention, a special condition code register does not have to be maintained since the macro or microaddress itself receives the modification bits.

Thus, still another object of the present invention is to provide improved address modification technique whereby a branch instruction may be used to directly insert condition codes into an existing instruction address to permit $2^n$-way branching, where $n$ represents the number of different condition codes.

Another interesting possibility in the use of the invention is the automatic insertion of interrupt condition bits into an address to expedite the servicing of the interrupt. Here again, the invention provides an important improvement over the conventional technique where the interrupt code is used as an indirect address rather than as a means of direct modification of a present address.

The above and other objects of the invention are achieved in several illustrative embodiments as described hereinafter. The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only and are not intended as a definition of the limits of the invention.

FIG. 3 is a block diagram of that part of the system of FIG. 1 for performing microbranching for address generating;

FIG. 4 is a block diagram illustrating the basic parts of a microbranch control specifically related to address condition signals;

FIG. 5 is a chart which is related to the operation of the embodiment of FIG. 4;

Figure 13:
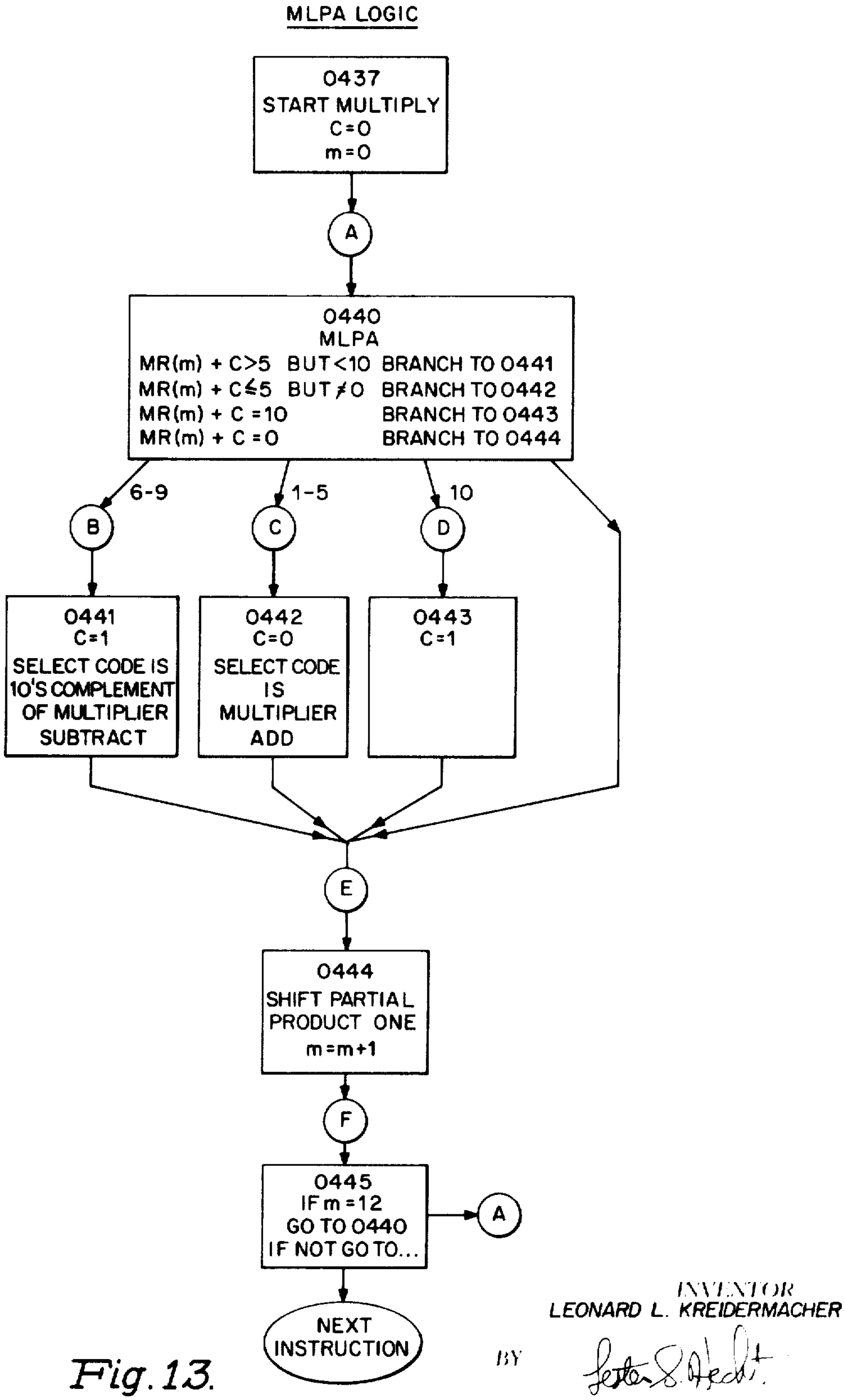

FIGS. 10*a*, 10*b*, 10*c*, 10*d* and 10*e* together provide a detailed flow diagram illustrating the basic microprogram control for multiple-product usage in the case of decimal multiply;

FIG. 11 illustrates how the microbranch instruction of the present invention may be used to carry out the functions specified in FIGS. 10;

FIG. 12 sets forth in detail various microinstructions which are used to accomplish decimal multiply in the example considered here; and FIG. 13 is a detailed flow diagram with specific ROM addresses to illustrate the operation of the invention with respect to decimal multiply.

Figure 1:
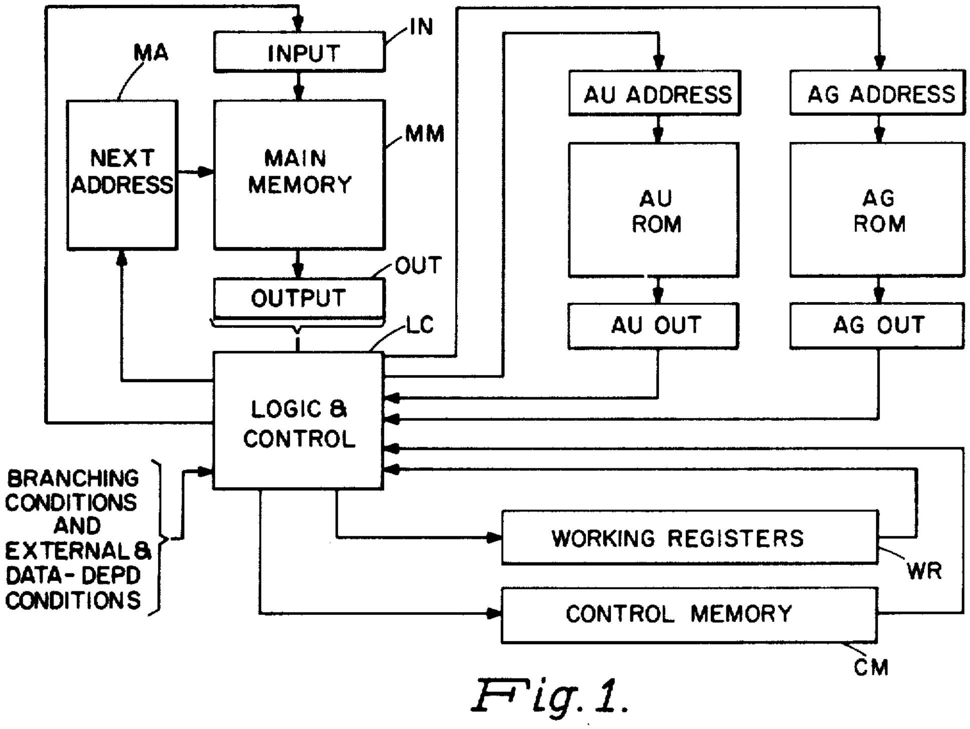
FIG. 1 is a block diagram of a typical system employing the present invention.

Reference is now made to FIG. 1 where it will be noted that the system contains a main memory MM which has means for entering memory contents through a control referred to as IN, the address for MM being specified by a Memory Address control referenced as MA, and the output from MM being derived through a device referred to as OUT.

Logic and control means LC is shown for receiving microinstructions from both an AG ROM (address generating) and an AU ROM (arithmetic unit) derived through respective output registers AG OUT and AU OUT. The AG ROM is controlled by an address control, AG Address, and the AU ROM is controlled by an address control, AU Address. Logic and control means LC has associated with it various working registers designated generically as WR and also a control memory designated generically as CM. Various branching conditions as well as external and data dependent condition signals are applied to means LC.

The purpose of FIG. 1 is to illustrate the general organization of the total system. The specific manner in which logic and control means LC is adapted for the various usages for the microbranch instructions of the invention will be discussed in detail in the following.

Figure 2:
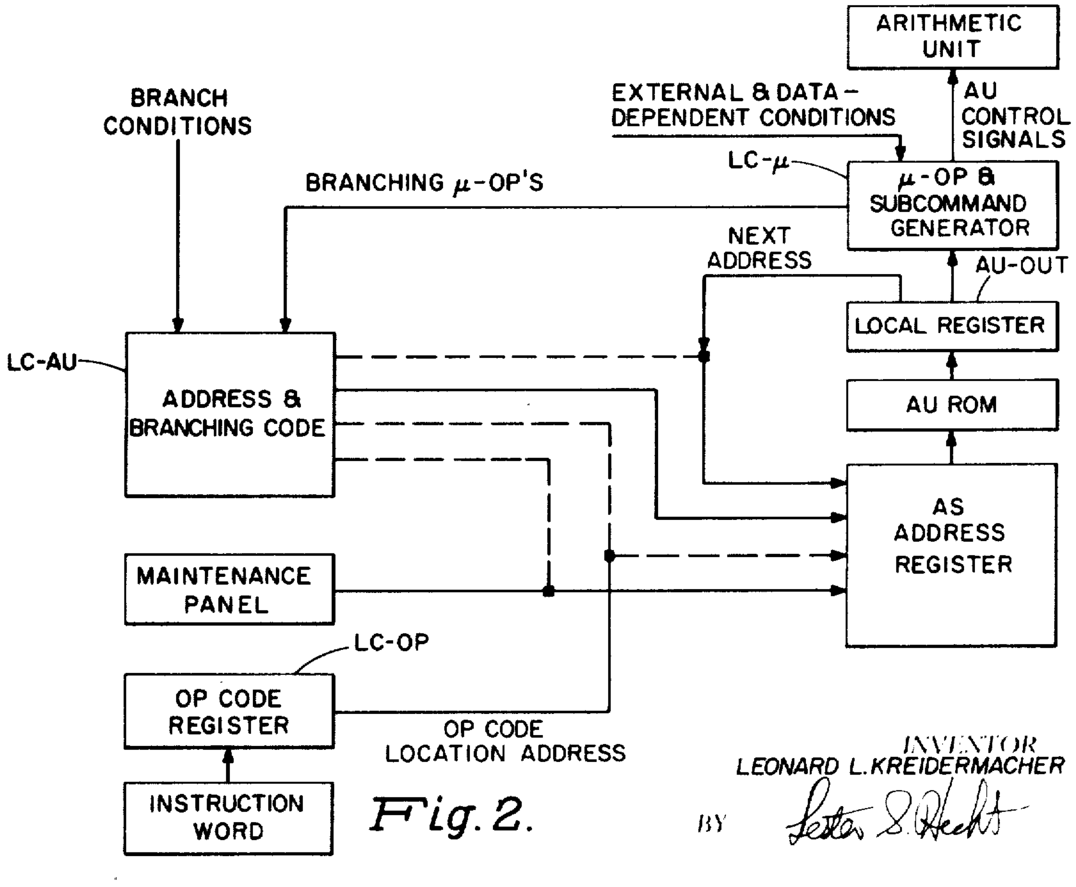
FIG. 2 is a block diagram of that part of the system of FIG. 1 which performs improved microbranching for arithmetic instruction control.

Reference is now made to FIGS. 2 and 3 where subsystem definitions are set forth for the use of the AU and AG ROMS respectively. Referring specifically to FIG. 2, it will be noted that the branch conditions which were applied to general means LC in FIG. 1 are shown as being applied to specific logic LC-AU. The address register shown in FIG. 2 controls the AU ROM the output of which is applied to a local register corresponding to AU OUT in FIG. 1. The local register is coupled to a $\mu$-OP subcommand generator forming part of means LC, from which the $\mu$-OPs used in the address and branching logic are derived.

It will also be noted that an OP-code register is shown, which also forms part of logic LC, controls the address branching logic going into the AU ROM address register. This is intended to point out that the sequence of microinstructions which are performed are initiated by an initial-forced branch which is a direct translation of the macroinstructions OP-code.

Special inputs of the External and Data dependent conditions as well as the Maintenance Panel are shown to illustrate special functions which may be considered to be part of the basic branch condition inputs to logic and control means LC. The main purpose of FIG. 2 is to relate the present specification to the description of a system embodying the present invention referred to as the Honeywell 8200, this description is found in: Honeywell Computer Journal Winter-Spring, 1968.

FIG. 3 illustrates the basic functions associated with the AG ROM. A sequence controller is shown as generating a signal corresponding to a starting address upon receipt of an instruction from the main memory. Increment logic is shown for providing an increment to the address register for normal sequence. Branching in this case is performed by receiving the branch address from the local register corresponding to the output of the AG ROM. The branch address is retained in a History Register, performing a function similar to a Location Counter in a conventional macroprogram system.

A local register, as in the AU ROM, receives signals applied to a $\mu$-OP and Subcommand Generator, which also receives various External Conditions, and various Branching Conditions are applied to Addressing and Branching logic, as in the case of FIG. 2.

Although the AU and AG controls of FIGS. 2 and 3 differ somewhat in the microinstruction format, as will be more fully set forth in the following, the novel $\mu$-branch control of the invention applies equally to both controls.

In the following, FIGS. 4 through 9 relate to the use of the AG ROM for address control and, specifically, to the microbranch control of the invention with respect thereto. FIGS. 10 through 13 relate, in a similar manner to the use of the invention with the AU ROM.

Reference is now made to FIG. 4 where branch $\mu$-OP signals from an AG microinstruction are shown as being applied to logic which also receives condition signals A*b*, I*b*, X*b*. The logic produces modified address bits which are combined with the AG address to produce the microbranch address, as will be more fully discussed in the following. The form of the microinstruction in FIG. 4 illustrates the case where a branch address is contained within the instruction, specifically in bit positions 2 through 10, so that it is possible to branch to a specific address, rather than to the modified branch address. Bits 11 through 16 are specified in FIG. 4 as being the branch $\mu$-OPs.

In actual practice the branch $\mu$-OP bits may be grouped to simplify the decoding, so that the maximum number of possibilities are not present. It will be assumed, for present purposes, that each branch $\mu$-OP defines precisely the condition bits which are to be combined with the present microaddress to form the modified address and, further, that the branch $\mu$-OP also specifies which bit positions of the present microaddress are to be modified.

As a further simplification, it will be assumed in the following that the microinstruction containing the branch $\mu$-OP is located at an address where the least significant octal code is "0." This permits simple "or" logic for combining the modifying condition bits with the present microaddress.

It will be understood, of course, that the invention is not limited to modification in the least significant bit positions, nor is the invention limited to use of "0" address bits for "or" modification, although this provides a simple mechanization scheme.

It will be assumed for the purpose of simplicity in illustration only, that condition bits X*b*, I*b*, and A*b*, as defined in FIG. 5, are used to modify the least significant address bits (initially 000) of the AG ROM, referenced as: AROM1-3; AROM1-2; and AROM1-1.

Referring now to FIG. 5, it will be noted that five condition codes are defined by the signals X*b*, I*b* and A*b*. If all three signals are "off," or zero, no A operand address is specified (A address Void) in the macroinstruction which is to be executed.

If only condition signal A*b* is on, direct addressing is specified where the operand is read from: *c*(A). This means that the contents (*c*) of the A address contains the operand which is to be read.

If signals I*b* and A*b* are "on," the addressing is indirect, where A is first replaced with *c*(A) and then the contents of this address are read. This reading may be specified as:

read *c*(*c*(A)).

If the address is direct but indexed where X*b* and A*b* are on the operand read may be defined as:

read *c*(A+X), where "X" is the index.

The last situation to be considered is where all condition bits are on (111) which defines the indirect, indexed address specified as:

read *c*(*c*(A)+X).

Many other types of addressing may be controlled in the manner described herein. Reference for an explanation of various types of control memory addressing as well as various forms of extended addressing is made, for this purpose, to copending patent application: "Instruction Translation Control With Extended Address Prefix Decoding" by John Mekota, David Hudson, Thomas Rankin, Jean Champagne, Ser. No. 875,902 filed Nov. 12, 1969.

In FIG. 5 $X_B$, $I_B$, and $A_B$ are condition bits used to modify the least significant address bits of the present address of the AG ROM of FIG. 3, which least significant address bits have been labeled AROM1-1, AROM1-2 and AROM1-3 in FIG. 4, with AROM1-1 representing the least significant bit, AROM1-2 the next least significant bit, and AROM1-2 the next least significant bit, and AROM1-3 the third least significant bit. NEW AROM represents the modify address when the condition bits are logically OR'd with the least significant bits. Five ROM addresses are shown corresponding to the five condition codes discussed above where addresses XX1, XX3, XX5, XX7 correspond respectively to the insertions of the condition codes X*b*, I*b* and A*b* in bit positions 3, 2 and 1, respectively, the least significant bits of the present from address. The case where all of the conditioned bits are off or zero is one where an arbitrary selection may be made to branch to any location which is not used by the other conditions. In this case it may be desirable, in fact, to design the logic so that the branch is made to the branch address in bits 2 through 10 as shown in FIG. 4. The corresponding bit representation of the actual inserts in bit positions 1, 2 and 3 of the ROM address is also shown in FIG. 5, for the present address XX4 is selected as the void A address branch. The "X" means that any octal code may be inserted.

Figure 6:
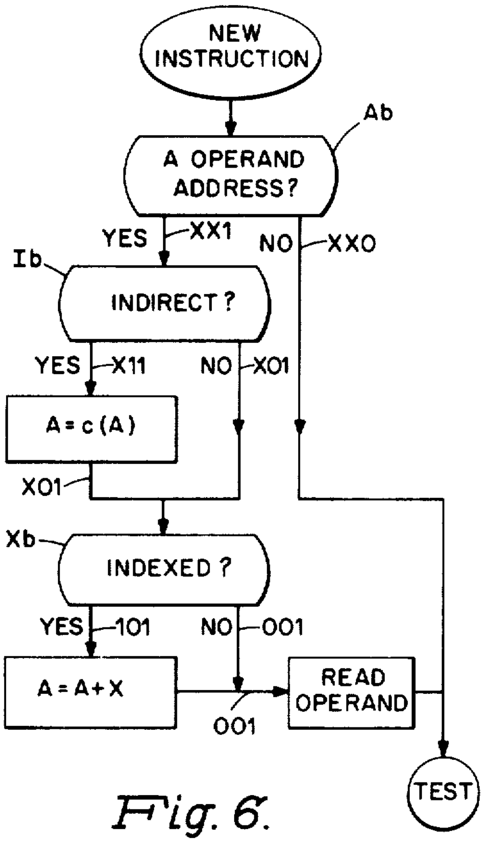
FIG. 6 is a flow diagram illustrating the general functions which must be performed in address generating where three basic conditions must be tested: A operand?; indirect address?; index?

Reference is now made to the flow diagram of FIG. 6 where the basic function of address control is shown. When a new instruction is read the first test which is made is whether or not an A address is specified. If it is not, the system branches directly to the "test" which will be discussed later. If an A operand address is specified (A*b*=1) a test must be made as to whether or not I*b* is also "on" for indirect addressing. If the address is direct (I*b*=0), a branch is made directly to the index test. If the address is indirect (I*b*=1), the A address is replaced by the contents of the A address (A=*c*(A)). As a special feature of the invention, logic is provided to turn condition bit T*b* off after the execution A=*c*(A). The next test is as to whether indexing is required. If no index is required, the operand is read following which the flow diagram proceeds to "test." If an index is required (X *b*=1), the execution A=A+X is performed, after which condition bit X*b* is turned off so that entry to Read Operand is made with a condition code setting of 001. Condition bit A*b*=1 is turned off to force 000 which forces branch to "test".

Figure 7:
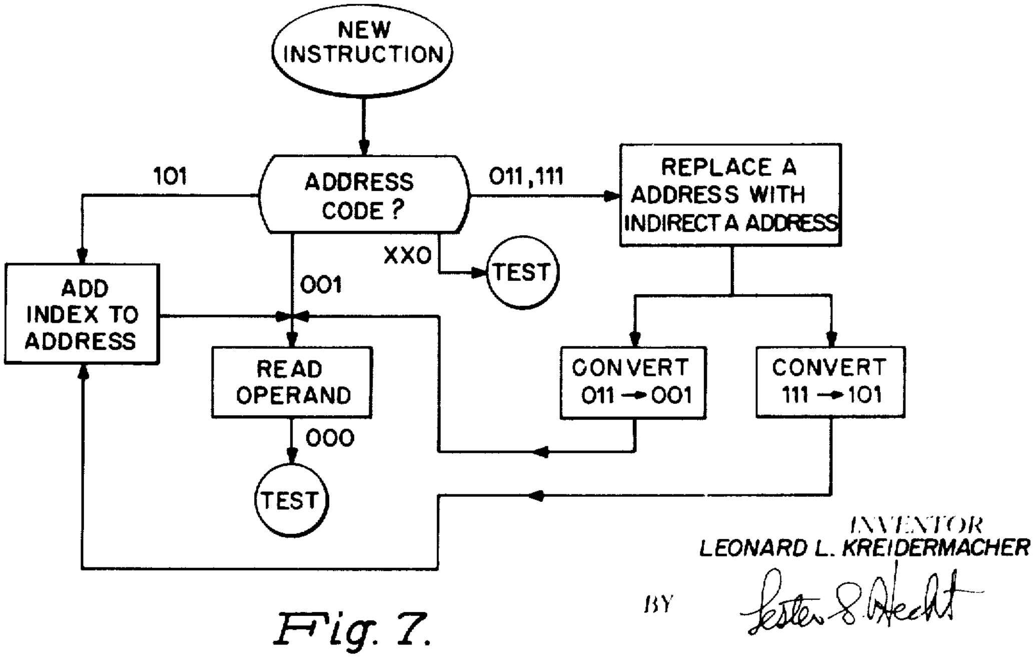
FIG. 7 is a flow diagram corresponding to that of FIG. 6, but with certain simplifications to illustrate the manner in which the invention operates.

In FIG. 7 the flow diagram of FIG. 6 is simplified to show multiple branching from the address code question where, if the condition code among X*b*, I*b* and A*b* is either 011 or 111 the system branches to the function of replacing the A address with the indirect A address following which code 011 is converted to 001 and code 111 is converted to 101. Code 101 causes indexing and then branches to 001, whereas the direct conversion of 011 to 001 bypasses the indexing step.

Figure 8:
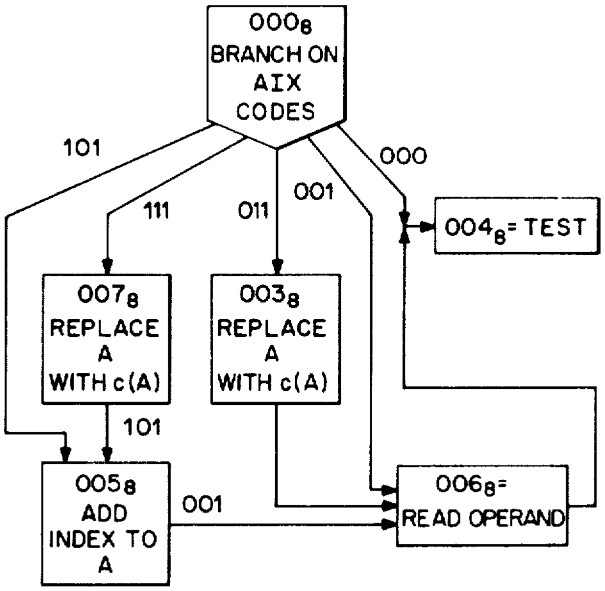
FIG. 8 is another flow diagram with specific address codes to illustrate a specific use of the microbranch instruction of the invention with respect to address generating.

FIG. 8 shows another specific illustration of the functioning of the flow diagram in FIG. 6 where the initial microinstruction address is assumed to be $000_8$ (octal).

In FIG. 8 octal address is assumed as a particular illustration. The branch $\mu$-OP, referred to as BAIX (Branch on A*b*, I*b*, and X*b*), is assumed to be in microaddress location $000_8$. The three-bit condition code X*b*, I*b*, A*b* is inserted as an octal digit to cause a direct branch to the proper microaddress. Thus, bit codes 001, 011, 101 and 111 cause branching to 006, 003, 005 and 007, respectively.

It will also be noted that the condition bit modification technique of the invention is also employed whereby code 111 is converted to 101, 101 is converted to 001, and 011 is converted to 001. An initial code of 000 is converted to 004 by logic or a conventional unconditional branch, so that all microinstructions eventually lead to the "test" microinstruction as previously noted.

The purpose of the "test" will be briefly described here, reference to copending patent application, "Sharing of Microprograms Between Processors" by George Hoff and Richard Kelly, Ser. No. 875,900 filed Nov. 12, 1969, being made for particular details as to a particular mechanization.

The "Test" is employed to determine whether any interrupts or special conditions have been detected which would make it impossible to execute the instruction. For example, if the OP-code of the macroinstruction was "illegal" or not in the processor's basic repertoire, the test function would provide a branch to a special "trap" subroutine. Another purpose of the test would be to force a branch or "trap" to special interrupt locations to process either data-related or external interrupts, or perhaps to service a special program call such as one relating to I/0 processing. Reference for information respecting a call for I/0 processing should be made to copending application, "Method and Apparatus for Peripheral Device Assignment and Validity Check and Relocation, if Assignment is Valid" by James B. Geyer and Victor M. Benson. Ser. No. 875,901 filed Nov. 12, 1969.

Figures 9, 10A, 10B, 10C, 10D, 10E:
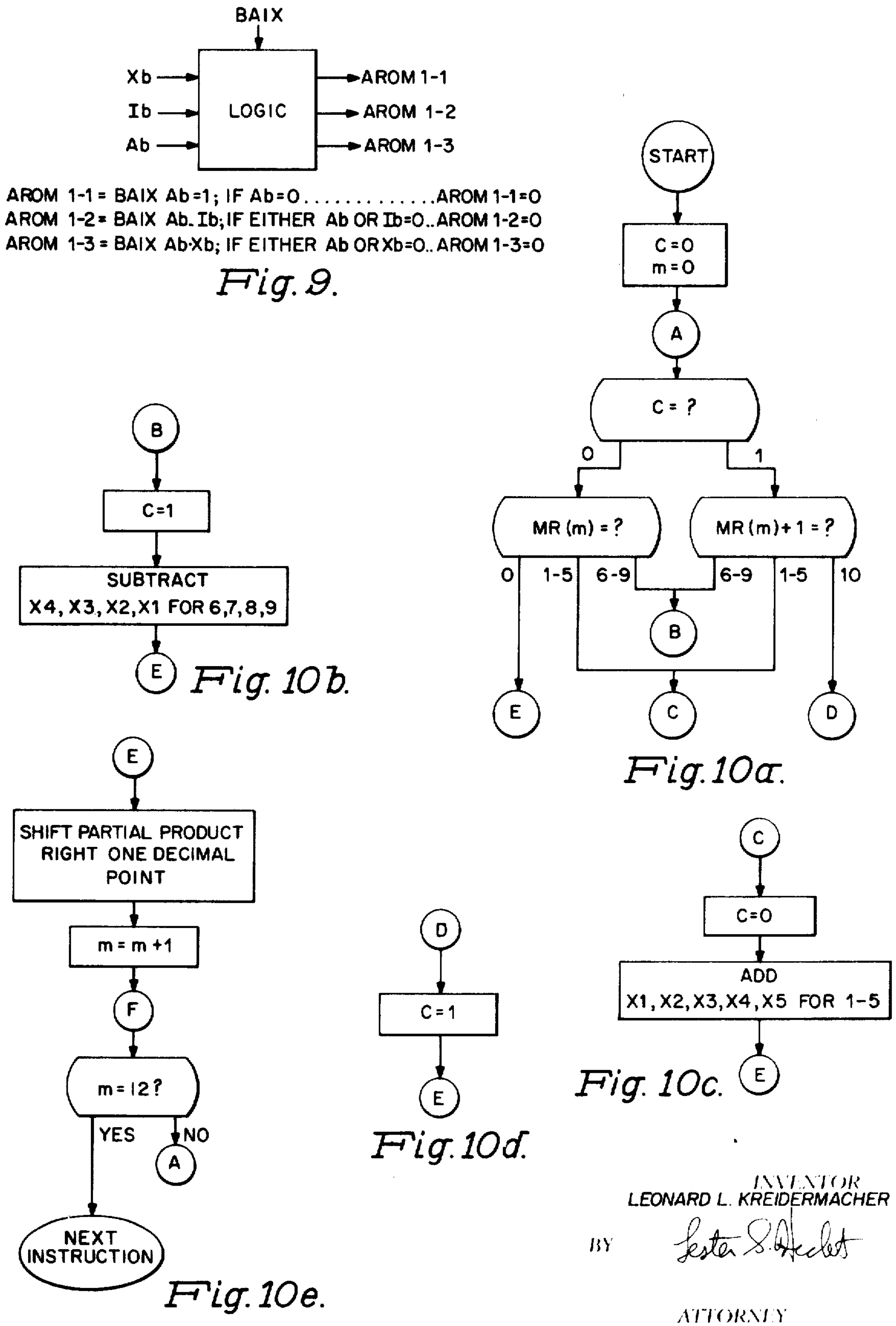
FIG. 9 shows the basic logic which is used to develop the modified ROM addresses for the case of address-generating.

FIG. 9 illustrates the general form of logic for producing modified address bits AROM1-1, AROM1-2, and AROM1-3 which are defined as follows:

AROM1-1=BAIX.A*b* + (other branch $\mu$-OP with related condition bits such as A*b*).

AROM1-2=BAIX.A*b*.I*b* + (other branch $\mu$-OP with related condition bits such as A*b*).

AROM1-3=BAIX.A*b*.X*b* + (other branch $\mu$-OP with related condition bits such as A*b*).

The interpretation of this logic as shown in FIG. 9 is that when the branch on A*b*, I*b*, X*b* $\mu$-OP code is detected, bit AROM1-1 is set to "1" only if A*b*=1. If A*b*=0 during BAIX=1, the specified address bit is not changed.

In a similar manner, AROM1-2=BAIX.A*b*.I*b* signifies that the address bit becomes a "1" only if the $\mu$-OP BAIX is called for in the microinstruction and both A*b* and I*b* are "on" or equal to "1". The AROM1-3 bit logic specifies that BAIX, A*b*, and X*b* must be on or "1" for the related address bit to be set.

As previously noted, upon conclusion of a specified indirect address execution (A=*c*(A)), the related condition bit is turned off. Therefore a zero-set term may be defined:

*o*AROM1-2 = completion of A *c*(A).

In a similar manner, AROM1-3 may be turned off after indexing by:

*o*AROM1-3 = completion of A=A+X.

As previously noted that simple case of insertion or "OR-ing" into the least significant total octal position of the microaddress may be extended to cover 2n address bit locations within the microaddress, where "*n*" is the number of condition bits. Furthermore, the bit locations within the microaddress may be selected from the most significant bits to permit jumps over, for example, 256 locations, by directly modifying the ninth address bit. Other variations will be apparent from the examples given herein.

The remaining part of this specification is devoted to illustrating one application of the present invention to arithmetic control. The specific case selected is that of microprogrammed decimal multiplication with particular reference being made to the technique more particularly described in copending application: "Apparatus for Performing Arithmetic Operation on Numbers Using a Multiple Generating and Storage Technique," by Leonard L. Kreidermacher and David M. Hudson, Ser. No. 875,909, filed Nov. 12, 1969.

FIGS. 10*a* through 10*e* herein provide a flow diagram which defines the basic procedure set forth in the above-mentioned copending application Ser. No. 875,909 filed Nov. 12, 1969. In referring to FIG. 10*a* it will be noted that branch point (A) provides a set of tests which exit to one of (B), (C), (D), or (E). Corresponding to each exit a special flow diagram is provided with an entry point and Figure No. related thereto. Thus FIGS. 10*b*, 10*c*, 10*d*, and 10*e* correspond to exits (B), (C), (D) and (E) of FIG. 10*a*, and the functions specified therein correspond respectively to the operation which must be performed according to the technique of the copending application.

Basically, the technique is to branch to (E) directly for a multiplicand shift and increment of the multiplier digit counter (m) if the condition is "0" as detected during branch (A) of FIG. 10*a*. If the condition of the multiplier digit and carryover is a code 1–5 the branch is made to (C) where the carry signal "C" is set to "0" and addition directly of the submultiples X1, X2, X3, X4, and X5 is performed. The condition of 6–9 9 in the multiplier digit and carryover causes a branch to (B) where the carryover signal "C" is set to "1," and 10's complemented submultiples X4, X3, X2, and X1 are used for cases 6, 7, 8, and 9, respectively. These are subtracted. The case of condition 10 is similar to 0 except that the branch at (D) specifies that C=1 for the carryover. All of the branches (B), (C), and (D) flow to (E) to take care of the shifting of the Partial Product formed as specified above.

After the functions of branch (E) are completed the functions of (F) are performed to test for completion. If all multiplier digits have been used the Next Instruction is read; if not, a return branch to (A) is made.

A particular form which the hardware and microinstructions may take for the decimal multiply example of FIGS. 10 is set forth in FIGS. 11 and 12. In FIG. 11 the general form of the basic arithmetic branch instruction is shown, where bits 3 through 27 specify various $\mu$-OPS relating to branches. It is assumed for this example that the branch $\mu$-OP contained at branch (A) is the microinstruction referred to as MLPA in FIG. 12 which provides for the proper branches to (B), (C), (D) or (E) as previously noted.

In the hardware of FIG. 11 it will be noted that the Sign Control is a direct function of signal "C" which also constitutes the carryover. The Select Code Control is set up according to the definitions of the various microinstructions of FIG. 12 and cause the select logic to bring in the proper submultiple from one of registers RX1 through RX5 corresponding to X1 through X5, respectively.

The correspondence between the various microinstructions MLPB, MLPC, MLPD, MLPE, MLPF and NEXT MICRO should be apparent from the above discussion. It will be noted that the last letter of each microinstruction definition corresponds to the branch entry point (B), (C), (D), (E), and (F) of FIG. 10.

A specific case where the invention may be used with the arithmetic technique just described is shown in FIG. 13. Here it is assumed that the multiply operation begins at location $0437_8$ in the AU ROM. The various branches will be found to correspond to those previously considered.

Accordingly it should be apparent that the present invention provides a novel approach to microbranching in particular and to direct address modification for $2^N$-way branching in general.

I claim:

1. In a data processing system wherein macroinstructions containing OP-codes, address-condition signals, and addresses, are interpreted through the use of at least one microinstruction memory, a microbranch control comprising: first means for controlling the address selection of a microinstruction from said microinstruction memory; second means for receiving a selected microinstruction read from said microinstruction memory and for producing corresponding micro-output signals; third means for producing microbranch control signals in response to predetermined sets of said micro-output signals; and fourth means responsive to said address-condition signals and to said microbranch control signals for controlling said first means to modify the contents of said microaddress register as a direct logical function of said address-condition signals.

2. In a computer system wherein main memory instructions defining arithmetic operations are translated through the use of at least one ROM, containing a related set of microinstructions for each main memory instruction, an improved branch device for controlling the address of microinstruction selection from said ROM said device comprising: ROM address means for controlling the selection of a microinstruction from said ROM ROM output means for producing ROM output signals corresponding to the selected microinstruction; micro-OP decoding means for translating certain portions of said microinstruction into branch micro-OPS; first logic responsive to branch-condition input signals and to said ROM output signals for producing ROM address modifying signals; and second logic means for controlling said ROM address means to branch directly to the next ROM microinstruction address as a direct logical function of all branch-condition input signals related to the decoded related portion of said microinstruction specifying the corresponding branch micro-OP.

3. A microprogram address modification system comprising: a first device for storing the present microaddress; a second device for receiving predetermined sets of condition signals $C_1 \ldots C_n$ and the microbranch code from the microinstruction read from said present microaddress, each predetermined set of condition signals being related to a particular set of program branches; a third device for developing address modification signals as a function of said sets of condition signals and said microbranch code; and a fourth device for introducing said modification signals into said present microaddress at bit position designated by said microbranch code to form a new microaddress constituting the next microaddress for reading the next microinstruction.

4. A method for modifying certain bits of the present address of a microinstruction store as a direct function of a plurality of condition signals C1 ... C*n*, upon condition of the existence of a predetermined micro-OP code in the contents of said microinstruction store, said method comprising: firstly, decoding the contents of said predetermined micro-OP code to develop a particular branch microcode; secondly, combining said branch microcode with said condition signals C1 ... C*n* to develop address modification code bits corresponding respectively to certain bits of said present address; and, thirdly, performing a logical "OR" function to introduce said address modification bits into said present address to form the next microaddress.

5. A device for direct address modification of a from address as a function of condition bits A*b*, I*b*, and X*b* corresponding to: main memory address present, indirect address, and indexing, respectively, said device comprising: first logic means for producing a branch micro-OP-type designating signal; second logic means for combining said micro-OP-type designating signal with said condition bits to form address modification signals; and third logic means for introducing said address modification signals into said from address in positions specified by said type designating signal.

6. The device defined in claim 5 wherein said condition bits are used to define the following codes:

| *xb* | *Ib* | Ab | |
|---|---|---|---|
| 0 | 0 | 0 | Test for execution |
| 0 | 0 | 1 | Read *c*(A) |
| 0 | 1 | 1 | Read *c*(*c*(A)) |
| 1 | 0 | 1 | Read *c*(A+X) |
| 1 | 1 | 1 | Read *c*(*c*(A)+X). |

7. In a system wherein instructions are read from a main memory and interpreted, under the control of logic, through the use of at least one ROM the output of the from providing logical control signals used in said logic to specify certain $\mu$-OPs relating to the use of said main memory as well as working registers and control memory, the system further providing for the receipt of branch, external, and data dependent condition signals, a branch $\mu$-OP control comprising: first logic means for setting up an initial ROM address as a function of the main instruction read from said main memory; second logic means for updating said ROM address during the sequencing of said ROM for nonbranching $\mu$-OPs; third logic means for detecting the presence of special branch $\mu$-OPS within the contents of the output of said ROM fourth logic means selectively controlled by said third logic means for developing modified ROM address signals as the combined function of said special $\mu$-OPs and said condition signals; and fifth logic means for introducing said modified address signals into the next address for said ROM.

8. The branch $\mu$-OP control defined in claim 7 wherein the branch conditions relate to indirect addressing, void address, and indexing.

9. The branch $\mu$-OP control defined in claim 7 wherein the branch conditions relate to arithmetic switching as a function of data conditions.

10. The branch $\mu$-OP control defined in claim 7 wherein separate ROM's are provided for arithmetic control and address control, the arithmetic control ROM being an AU-ROM and the address control being AG-ROM.

11. The branch $\mu$-OP defined in claim 10 wherein said second logic means is used for arithmetic AU-ROM address nonbranch updating and derives the update address from a corresponding address field within the contents of the AU-ROM presently read.

12. The branch $\mu$-OP defined in claim 10 wherein said second logic means is used for address AG-ROM address nonbranch logic means and derives the update address as an incrementing function upon the present AG-ROM address.

13. A branching control comprising: first means for selecting condition signals related to a particular set of program branches; second means for logically identifying bit positions within a present instruction address register which relate to the possible entry points in a program following the execution of the program branches; and third means for generating address modification bits having respective logical associations with said condition signals and for introducing said modification bits into said logically identified bit positions within the present instruction address register.

14. In combination with a ROM, a ROM AG Address register, and a ROM Local register, a method of branching permitting $2^n$-way jumps in a store of microinstructions, where "$n$" is the number of branch conditions, said method comprising: specifying particular sets of condition bits in a microinstruction which apply to a branch operation; specifying particular bit positions in the present microinstruction location address where bit modifications are to be made to bits stored therein; developing modifying address bits having bit-to-bit correspondence with said condition bits; introducing said modifying address bits into said particular bit positions to form a modified branch address; and branching to said modified address of said store of microinstructions.

* * * * *

UNITED STATES PATENT OFFICE

CERTIFICATE OF CORRECTION

Patent No. 3,634,883 Dated January 11, 1972

Inventor(s) Leonard L. Kreidermacher

It is certified that error appears in the above-identified patent and that said Letters Patent are hereby corrected as shown below:

Column 10, line 20, after "ROM", first occurrence, insert a semicolon -- ; --; line 58, "from" should read -- ROM --; line 66, "from" should read -- ROM --; line 70, "x" should read -- X --. Column 11, line 4, "from" should read -- ROM --; line 15, after "ROM', insert a semicolon -- ; --.

Signed and sealed this 24th day of October 1972.

(SEAL)
Attest:

EDWARD M.FLETCHER,JR.
Attesting Officer

ROBERT GOTTSCHALK
Commissioner of Patents

)RM PO-1050 (10-69)

USCOMM-DC 60376-P69
☆ U.S. GOVERNMENT PRINTING OFFICE : 1969 O—366-334